United States Patent [19]

Pryor

[11] Patent Number: 4,471,802
[45] Date of Patent: Sep. 18, 1984

[54] PRESSURE REGULATOR ASSEMBLY WITH IMPROVED CARTRIDGE

[75] Inventor: David A. Pryor, Denton, Tex.

[73] Assignee: Victor Equipment Company, Inc., Denton, Tex.

[21] Appl. No.: 484,307

[22] Filed: Apr. 12, 1983

[51] Int. Cl.³ .................................... F16K 25/00
[52] U.S. Cl. ...................... 137/454.2; 137/454.5; 137/505.42; 137/315
[58] Field of Search ............ 137/454.2, 315, , 505.42, 137/505.41, 454.5

[56] References Cited

U.S. PATENT DOCUMENTS

| | | | |
|---|---|---|---|
| 2,747,607 | 5/1956 | Matasovic | 137/505.42 |
| 2,768,643 | 10/1956 | Aooub | 137/505.42 |
| 2,826,293 | 3/1959 | Vanderpoel | 137/505.42 |
| 3,113,756 | 12/1963 | Griffo | 137/505.42 X |
| 3,547,143 | 12/1970 | Mills | 137/315 |

Primary Examiner—Harold W. Weakley
Attorney, Agent, or Firm—Wofford, Fails & Zobal

[57] ABSTRACT

An improvement in a pressure regulator including the usual valve body, seat, poppet, adjustable spring having a bottom plate for co-acting with the low pressure diaphragm member. The improvement comprises an improved regulator in which the poppet includes a centering extension shaft extending to the low pressure side of the valve seat and a larger diameter shaft in communication with the high pressure inlet chamber and having the valve seat include centering upper protrusion that closely engages the centering extension shaft of the poppet with at least three and no more than six slots disposed substantially uniform thereabout such that gas can flow about the valve poppet centering extension shaft through the valves without inducing destructive and noisy vibration when gas flow is called for by the regulator.

10 Claims, 4 Drawing Figures

PRESSURE REGULATOR ASSEMBLY WITH IMPROVED CARTRIDGE

FIELD OF THE INVENTION

This invention relates to pressure regulators. More particularly, it relates to pressure regulators such as are employed on cylinders of compressed gases like oxygen in which a settable lower pressure is controlled by an adjustable spring mechanism and in which the gas is throttled to the low pressure from a high pressure.

DESCRIPTION OF THE PRIOR ART

The prior art has seen the development of a wide variety of pressure regulators for reducing discharge pressure from high pressure cylinders of compressed gases such as oxygen to the low pressure of only a few pounds per square inch (psi) as in hospital oxygen systems, torches, and the like. Basically these regulators have consisted of a cartridge, or core assembly, having a poppet, adjacent a seat, to control flow as necessary to attempt to effect balanced forces between a heavy spring opposed by a diaphram to which low pressure is applied. Patents such as U.S. Pat. No. 3,586,037 showed the ways of compensating single stage pressure regulators to obtain accurate regulation regardless of what the inlet pressure was. The later filed patents such as U.S. Pat. No. 3,812,877 and its divisional U.S. Pat. No. 3,906,982, described apparatus for overcoming the significant friction that accompanied the long expanses of metal-to-metal contact in many of the prior art regulators. Still later ones such as U.S. Pat. No. 4,257,450 showed pressure regulators having a lost motion connection so as to obtain reliable complete valve closure at every shutoff regardless of whether or not there were particles of carbon or the like adjacent the seat of the regulator.

One of the problems that has persisted in this field of pressure regulators and has not been satisfactorily solved is that of the vibration induced through resonance, or vibrations, caused by the high pressure gas flowing past a valve poppet as it nears its seat. This vibration is very destructive to the valve seat, particularly where hard seats are employed. Moreover, it produces a noisy vibration called "singing".

SUMMARY OF THE INVENTION

Accordingly, it is an object of this invention to provide a pressure regulator assembly having an improved cartridge that eliminates the destructive and noisy vibration of a poppet with respect to a seat when throttling gas flow.

Specifically, it is an object of this invention to provide a pressure regulator for reducing gas pressure from a high pressure cylinder of the gas to a low pressure end use in which a poppet is opened when additional gas flow is required as sensed by a regulator spring opposing a diaphragm subjected to the low pressure and in which the poppet is closed against the seat when the pressure is adequate and in which the improved cartridge of the regulator eliminates destructive and noisy vibration referred to as "singing" when gas flow is needed.

These and other objects will become apparent from the descriptive matter hereinafter, particularly when taken into conjunction with the appended drawings.

In accordance with this invention, there is provided an improvement in a pressure regulator for reducing pressure from high pressure to a low pressure in which the regulator includes a valve body, seat, poppet, adjustable spring and diaphram member in the usual type regulator construction. The improvement is characterized by having an improved cartridge in which there is included a poppet that includes a centering extension shaft extending to the low pressure side of the valve seat and a larger diameter shaft in communication with the high pressure in the chamber and having the valve seat include centering upper protrusion that closely engages the centering extension shaft of the poppet with at least three and no more than six slots disposed substantially uniformly thereabout such that gas can flow about the valve poppet centering extension shaft through the valve seat without inducing destructive and noisy vibration when gas flow is called for by the regulator.

In the preferred embodiment, there are four slots disposed diametrally opposite each other for balanced loading on the poppet and obtaining good flow characteristics.

DESCRIPTION OF PREFERRED EMBODIMENT(S)

Figure 1:
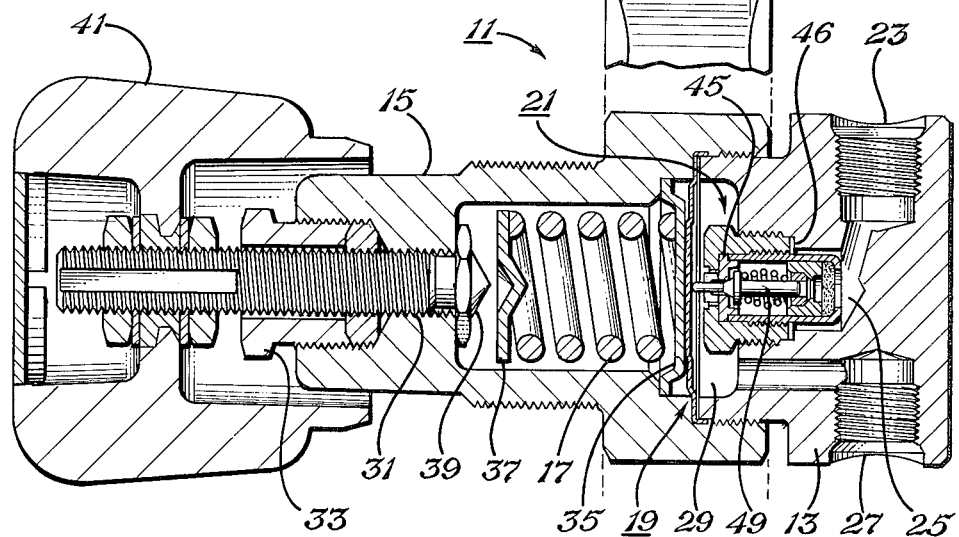
FIG. 1 is a partial cross sectional view of the pressure regulator in accordance with one embodiment of this invention.

In FIG. 1 there is illustrated a cross sectional view of the regulator 11. Regulator 11 comprises the main subassemblies of body 13, regulator cap 15 with its adjustable spring 17, diaphram means 19 and cartridge, or core assembly, 21.

The body 13 has inlet passageway 23, inlet chamber 25, outlet passageway 27 and outlet chamber 29. As illustrated, the inlet and outlet passageways 23, 27 are threaded so as to receive a properly threaded male insert, such as a nipple, threaded insert or the like. As is recognized, such threads may be appropriately right handed or left handed depending upon the nature of the gas and to prevent inadvertently attaching the regulator 11 to an incorrect cylinder of gas. For example, regulators that are employed on inert gases may have substances, such as oil or grease, that would be incompatible with reactive gases such as oxygen. Coded threading is frequently employed to prevent inadvertent wrongful attachment and is employed in the body of this regulator.

The inlet passageway 23 and the inlet chamber 25 may be subjected to the high pressure before it is regulated to the lower pressure and are designed to handle the high pressure. Conversely, the outlet passageway 27 and the outlet chamber 29 ordinarily are subjected to only the lower, regulated pressure to which the regulator is set by the adjustment setting to the regulator cap 15 and its adjustable spring 17.

The regulator cap 15 is removably affixed to the body 13, as by threaded connections and has a compression adjusting means illustrated by threaded stud 31 screwed through tapped bushing 33 which is, in turn, screwed into the appropriate threaded aperture in the cap 15.

The adjustable spring 17 has a bottom plate 35 contiguous with the diaphram means 19 and is adapted to move therewith as pressure changes in the outlet chamber 29. The spring 17 has a compression plate 37 at its top that co-engages and is responsive to the pressure nut 39 on the threaded stud 31. A handle 41 is provided for rotating the stud 31 to increase or decrease compression and, consequently, increase or decrease the low pressure that is regulated downstream of the regulator 11.

The adjustable spring 17 is made of any material that will have the required strength. For example, it may be made of steel since it is not subjected to the corrosive gases. The usual type springs may be employed in this regulator and no special alloys or springs are required.

The diaphram 19 is held in place intermediate the top 15 and the body 13. It engages the valve stem of the cartridge 21 and is contiguous to and moves concurrently with the bottom plate 35. Ordinarily the diaphram will be formed of a tough flexible material such as Neoprene or other fluid impermeable material. The diaphrams employed in the prior art may be employed in this invention and no special material of construction is required.

Figure 2:
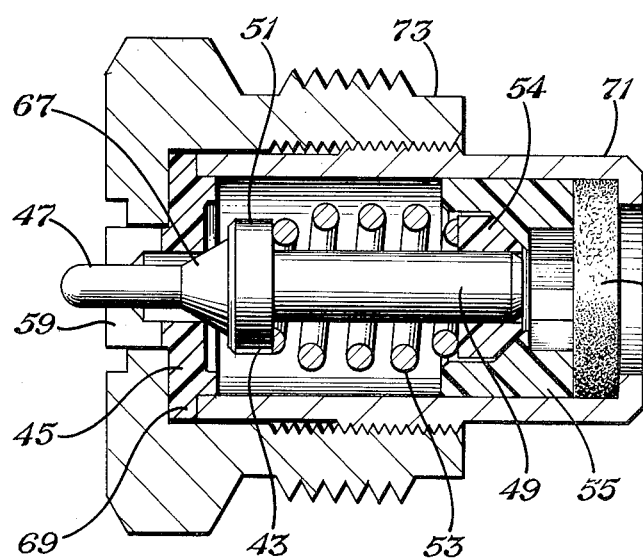
FIG. 2 is a cross sectional view of the improved cartridge of FIG. 1.

The main improvement of this invention lies in the improved cartridge 21 and its included poppet 43 and seat 45, also shown in FIG. 2. The improved cartridge screws into its receptacle and sealingly seats on gasket 46. As can be seen more clearly in FIG. 2, the poppet 43 includes a centering extension shaft 47 that extends to the low pressure side of the valve seat 45. As illustrated, the poppet includes a larger diameter shaft 49 communicating with the high pressure side of the valve seat 45. The poppet 43 includes an annular shoulder 51 to provide a bearing surface for a biasing spring 53. The biasing spring 53 biases the poppet toward the seat 45 when the forces between the diaphram means 19 and the spring 17 are equal. A thermoplastic base plug 54 reciprocally receives the larger diameter 49 and is, in turn, disposed within the tubular base 55. A filter 57 is provided to filter the incoming gases.

The usual materials or workmanship can be employed in this invention. For example, the respective poppets, bushings, cartridge elements and the like may be formed from brass, stainless steel or other metallic materials appropriate to the type of gas being flowed therepast. Where there is very little compressive and tensile stresses, thermoplastic materials can be readily employed. Typically, the thermoplastic materials may be Nylon, Orlon, polyethylene, or the polyhalogenated hydrocarbon materials. It is desirable, however, that the poppet 43 have low friction with respect to elements against which it will reciprocate, such as the base plug 54 and the seat 45.

Figure 3:
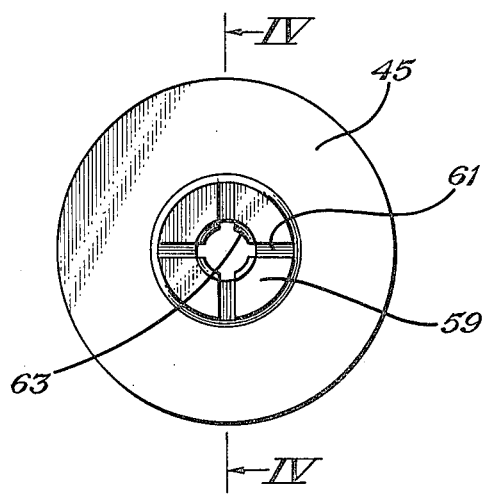
FIG. 3 is a top view of the valve seat of FIGS. 1 and 2.
Figure 4:
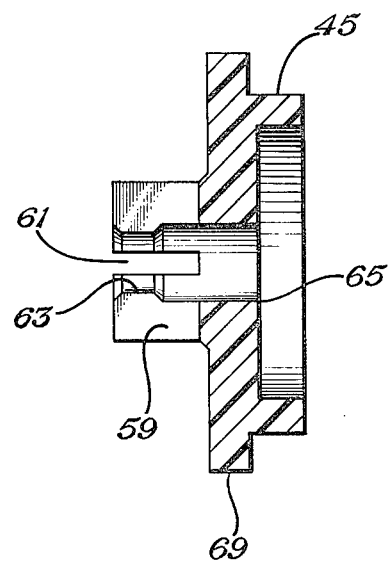
FIG. 4 is a cross sectional view taken along the lines IV—IV of FIG. 3.

The seat 45 includes a centering upper protrusion 59 that closely engages and co-acts with the centering extension shaft of the poppet to prevent the destructive and noisy vibrations that are ordinarily induced when gas flow is called for by a regulator. The valve seat 45 has a plurality of at least three and no more than six slots formed into the upper protrusion 59 and disposed substantially uniformly about the centering extension shaft 47 for allowing gas to flow when it is called for by the regulator 11. As illustrated, four slots 61 are provided and form the preferred embodiment in which the respective slots are diametrally opposite each other as shown in FIG. 3. Thus, the respective four shafts divide the centering protrusion 59 into four respective centering shoulder tabs 63, FIGS. 3 and 4. The valve seat 45 provides a sharp annular ring 65 against which to seat the frustal conical shoulder 67 of the poppet 43. A surrounding annular shoulder 69 allows the seat to be held intermediate an interior cage 71, FIG. 2 and the outer bushing 73. As can be seen in FIG. 1, the entire cartridge assembly can then be screwed into a threaded receptacle in the body 13.

The valve seat is preferably formed of a thermoplastic material that is resistant to corrosion and erosion by the gas being regulated. For example, it is preferred that tough thermoplastic material such as Nylon, Orlon, Delrin and Kel-F be employed. When oxygen is employed, the Kel-F is a preferred type of material from which to form the valve seat 45. As is recognized, Kel-F is chlorotrifluoroethylene that is polymerized into the desired hardness. It is commercially available from DuPont and can handle gases that would be corrosive to other thermoplastic materials as well as to metals.

In operation, the low pressure regulator 11 is connected with a high pressure cylinder of gas (not shown) by inlet 23 and appropriate conduit connection (also not shown). With zero pressure set by compression adjusting means in regulator cap 15, the pressure in high pressure chamber 25, coupled with urging from spring 53, forces the poppet to engage the frustal conical shoulder 67 with the seat ring 65 of the valve seat and block flow of gas.

When the threaded stud 31 is screwed downwardly, pressure is applied to spring 17 and force is transmitted to unseat the poppet shoulder 67 by the force from diaphram means 19, bottom plate 35 and centering extension shaft 47. Outlet chamber 29, having already been connected with a suitable end use function, such as a oxygen connection, welding torch or the like, has pressure build up to a value determined by the degree of compression afforded by the spring 17. As pressure increases in the low pressure chamber 29, the pressure acting on the diaphram means 19 counter balances the force of the spring 17 allowing the seat to be engaged by the poppet again and block the flow of fluids. During the opening and closing of the poppet with respect to the seat, the normally destructive and noisy vibration that is frequently otherwise induced is prevented through the coaction of the centering extension 47 of the poppet 43 and the centering protrusion 59 of the seat 45.

Once the device employing the fluid from the outlet begins to operate; as by taking oxygen by a welding torch, oxygen mask, tent or the like; pressure decreases, unbalancing the force opposing spring 17 which again depresses the poppet 43, opening a flow passageway around the centering protrusion 47 and through the slots 61. Flow of the fluid continues until the pressure begins to build up to balance the forces again. The flow of fluid may be greater or lesser amounts. In every flow situation, the destructive and noisy vibrations that are normally introduced in regulators are prevented by this invention.

From the foregoing, it can be seen that this invention achieves the objects set out hereinbefore.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. In a pressure regulator for reducing pressure from high pressure to a low pressure and including:
   a. a valve body having inlet and outlet passageways and chambers;
   b. a valve seat intermediate said inlet and outlet chambers;
   c. a valve poppet for sealingly engaging against said valve seat;
   d. adjustable spring with a bottom plate for adjusting the low pressure; and
   e. diaphram member communicating with said low pressure chamber so as to sense said low pressure and opposing said adjustable spring so as to allow said valve poppet to close against a valve seat when said pressure becomes great enough and to open when said low pressure is below, the predetermined pressure set on said adjustable spring;

the improvement comprising:
   f. having said poppet include a centering extension shaft extending to the low pressure side of said valve seat and a larger diameter shaft in communication with said high pressure inlet chamber; and
   g. having said valve seat include centering upper protrusion that closely engages said centering extension shaft of said poppet with at least three and no more than six slots disposed substantially uniformly thereabout such that gas can flow about said valve poppet centering extension shaft through said valve seat without inducing destructive and noisy vibration when gas flow is called for by said adjustable spring opposing said diaphram member.

2. The pressure regulator of claim 1 wherein said centering upper protrusion of said valve seat includes four slots; two each being diametrally opposite each other.

3. The pressure regulator of claim 1 wherein said valve seat is formed of a thermoplastic material and said valve poppet is formed of a metallic material.

4. The pressure regulator of claim 3 wherein said thermoplastic material is chlorotrifluoroethylene.

5. The pressure regulator of claim 1 wherein said larger diameter shaft of said valve poppet is surrounded by second spring by said valve poppet toward its closed position such that said second spring and high pressure tend to close said valve poppet when said low pressure becomes too high; and said centering extension shaft is adapted to engage said diaphram and said bottom plate of said adjustable spring so as to open said valve poppet when said low pressure becomes too low.

6. A pressure regulator for reducing presence from high pressure to low pressure comprising:
   a. a valve body having inlet and outlet passageways and chambers;
   b. a valve cap including an adjustable spring for adjusting the flow pressure and having a bottom plate; diaphragm means communicating with the low pressure chamber and contiguous the bottom plate on said adjustable spring and opposing said adjustable spring so as to allow a valve poppet to close against a valve seat when the pressure becomes great enough and to open a valve poppet when the pressure is too low; an improved cartridge that includes a reciprocally moveable valve poppet adapted to seat against a valve seat; said poppet including a centering extension shaft extending to the low pressure side of said valve seat and a larger diameter shaft in communication with a high pressure inlet chamber; said valve seat including centering upper protrusion that closely engages said centering extension shaft of said poppet, with at least three and no more than six slots disposed substantially uniformly thereabout such that gas can flow about such valve poppet centering extension shaft through said valve seat without inducing destructive and noisy vibration when gas flow is called for by said regulator.

7. The pressure regulator of claim 1 wherein said valve seat includes four slots; two each being diametrally opposite each other.

8. Pressure regulator of claim 1 wherein said valve seat is formed of thermoplastic material and said valve poppet is formed of metallic material.

9. The pressure regulator of claim 8 wherein said thermoplastic is chlorotrifluoroethylene.

10. The pressure regulator of claim 6 wherein said larger diameter shaft of said valve poppet is surrounded by a second spring biasing said valve poppet toward its closed position such that said second spring and high pressure tend to close said valve poppet when said low pressure becomes too high; and said centering extension shaft is adapted to engage said diaphram and said bottom plate of said adjustable spring so as to open said valve poppet when said low pressure becomes too low.

* * * * *

UNITED STATES PATENT AND TRADEMARK OFFICE
CERTIFICATE OF CORRECTION

PATENT NO. : 4,471,802
DATED : Sep. 18, 1984
INVENTOR(S) : Pryor

It is certified that error appears in the above-identified patent and that said Letters Patent is hereby corrected as shown below:

Col. 6, line 5: "presence" should be --pressure--.

Signed and Sealed this

Tenth Day of December 1985

[SEAL]

Attest:

Attesting Officer

DONALD J. QUIGG

Commissioner of Patents and Trademarks